Sept. 8, 1959     E. J. NOLAN     2,902,892
WORK-HOLDER FOR A MACHINE TOOL
Filed May 9, 1958     2 Sheets-Sheet 1
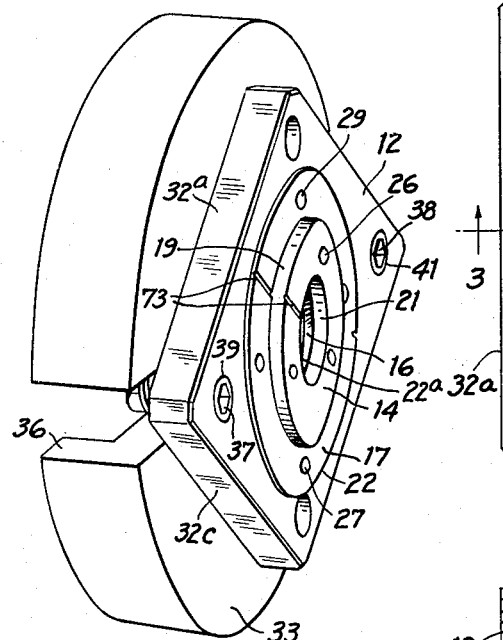
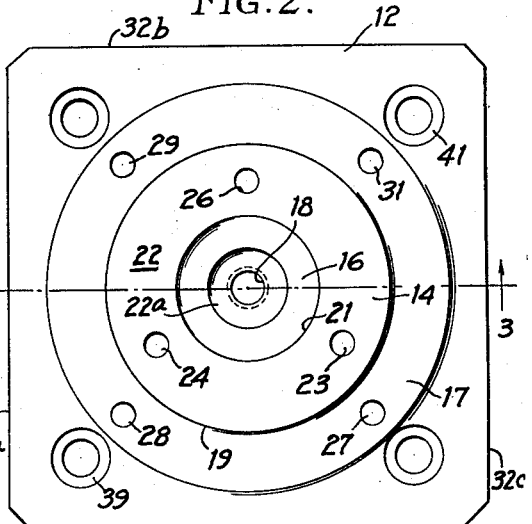
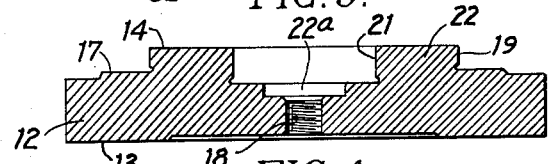
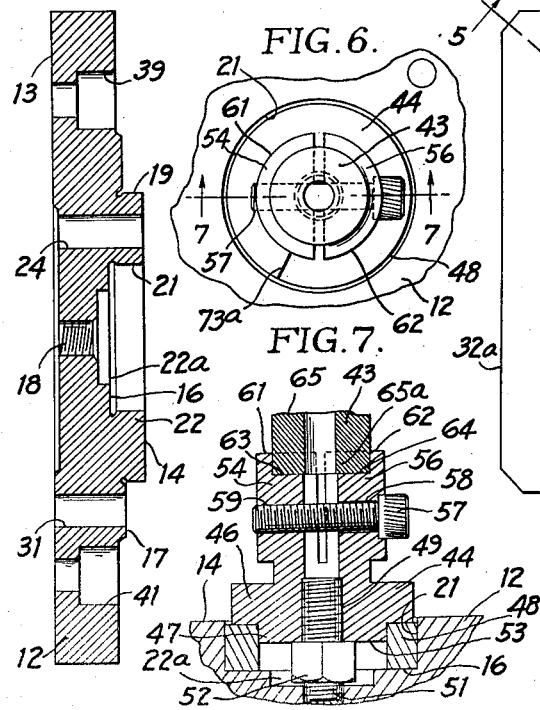
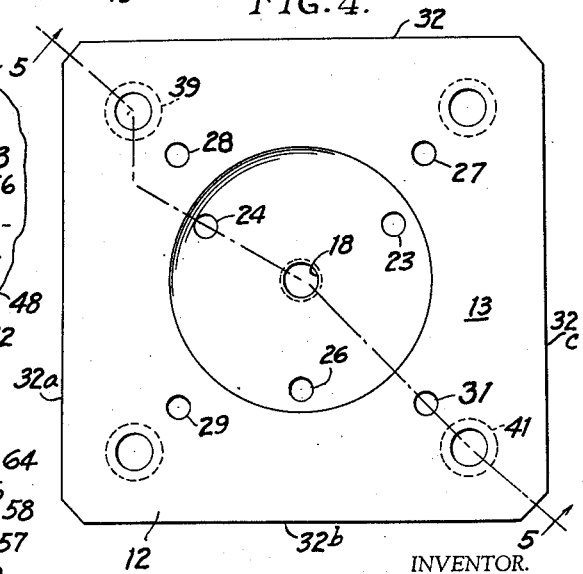
INVENTOR.
EDWARD J. NOLAN
BY *Jugelter & Jugelter*
ATTORNEYS

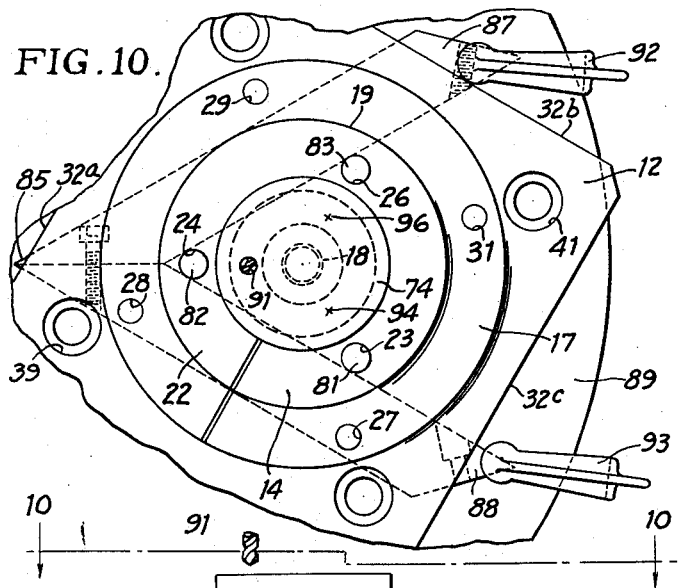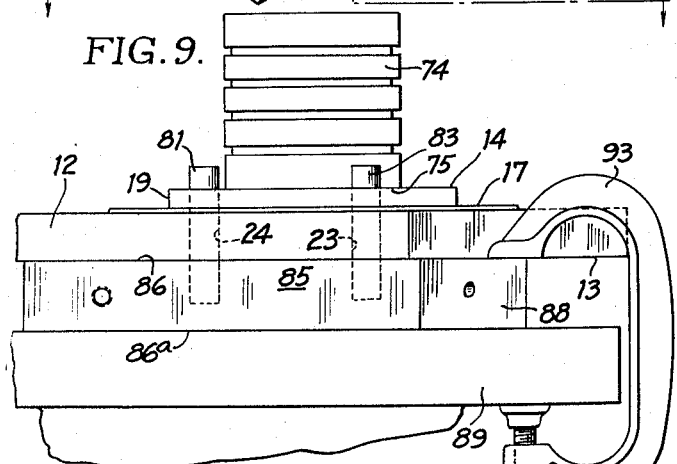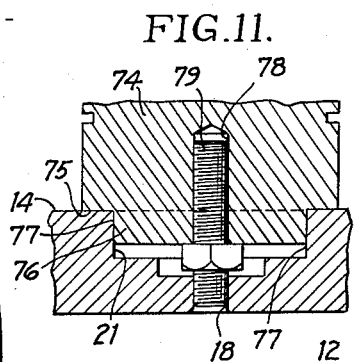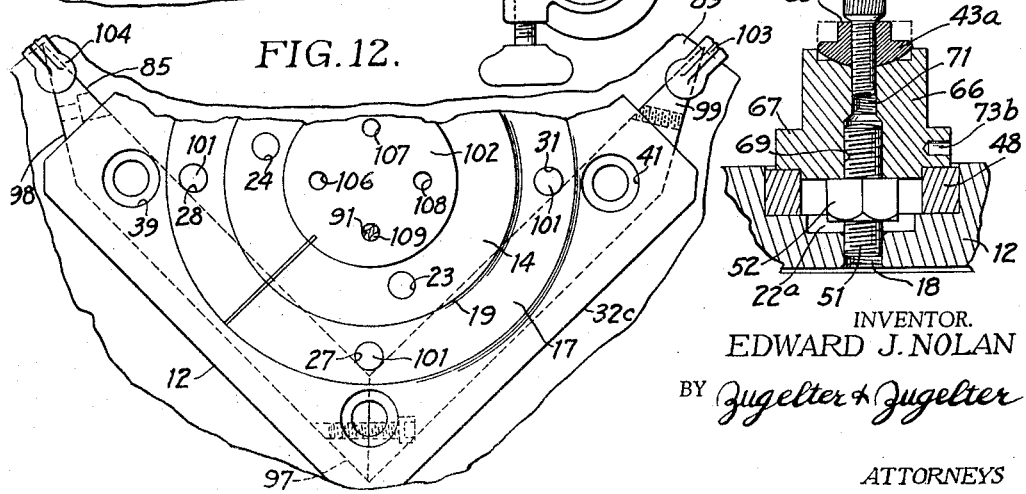
Sept. 8, 1959 — E. J. NOLAN — 2,902,892
WORK-HOLDER FOR A MACHINE TOOL
Filed May 9, 1958 — 2 Sheets-Sheet 2
INVENTOR.
EDWARD J. NOLAN
BY Jugelter & Jugelter
ATTORNEYS

United States Patent Office 2,902,892
Patented Sept. 8, 1959

2,902,892

WORK-HOLDER FOR A MACHINE TOOL

Edward J. Nolan, Detroit, Mich.

Application May 9, 1958, Serial No. 734,289

3 Claims. (Cl. 77—63)

This invention relates to a device for holding a workpiece in a machine tool. More particularly, this invention relates to a work-holder which can be mounted on a face-plate or table of a machine tool for aligning and centering a workpiece held thereon.

An object of this invention is to provide a work-holder, which, when properly centered and aligned on a face-plate or table of a machine tool, will automatically center and align a workpiece mounted thereon.

A further object of this invention is to provide a device of this type having a flat workpiece-engaging face, a cylindrical workpiece-engaging face perpendicular to the flat face, and a threaded opening coaxial with the cylindrical face so that the workpiece holder can align and center the workpiece when the workpiece is mounted on a stud or the like extending into the threaded opening.

A further object of this invention is to provide a workpiece holder which can be used to accurately position a workpiece on the table of a machine tool in a plurality of positions for drilling a plurality of openings spaced equally angularly in the workpiece.

The above and other objects and features of this invention will be apparent to those skilled in the art to which this invention pertains, from the following detailed description, and the drawings, in which:

Figure 1 is a perspective view showing a holder for a workpiece constructed in accordance with an embodiment of this invention, the holder being shown attached to a face-plate of a machine tool, details of the machine tool on which the face-plate is mounted, being omitted;

Fig. 2 is a plan view of the work-holder removed from the face-plate;

Fig. 3 is a view in section taken on the line 3—3 in Fig. 2;

Fig. 4 is a view in bottom plan of the work-holder;

Fig. 5 is a view in section taken on the line 5—5 in Fig. 4;

Fig. 6 is an enlarged plan view of a chuck, a workpiece, and an adapter ring mounted on the work-holder, only a fragmentary portion of the work-holder being shown;

Fig. 7 is a view in section taken on the line 7—7 in Fig. 6;

Fig. 8 is a view in transverse section showing the work-holder and the adapter ring together with another chuck device mounted therein, the workpiece being shown mounted in the other chuck, the outline of the workpiece in partly completed form being shown in dot-dash lines, the completed workpiece being shown in full lines;

Fig. 9 is a view in side elevation showing the table of a drill press with a positioning angle, a work-holder equipped with positioning pins, and a workpiece mounted thereon;

Fig. 10 is a view in section taken on the line 10—10 in Fig. 9;

Fig. 11 is a fragmentary view in transverse section showing the work-holder and the workpiece of Fig. 10; and Fig. 12 is a view similar to Fig. 10 but showing the drill press with another positioning angle, a work-holder equipped with another set of pins, and another workpiece mounted thereon.

In the following detailed description, and the drawings, like reference characters indicate like parts.

In Figs. 2–5 inclusive is shown a work-holder or plate 12 constructed in accordance with an embodiment of this invention. The work-holder 12 is formed of a single piece of steel machined to the shape shown. The work-holder 12 includes a flat back face 13 and front faces 14, 16 and 17 which are parallel to the back face 13. A threaded bore 18 is provided through the center of the plate. The axis of the bore 18 is perpendicular to the faces 13, 14, 16 and 17. Cylindrical faces 19 and 21 are provided on an annular boss 22 which terminates in the face 14. The cylindrical faces 19 and 21 are perpendicular to the faces 13, 14, 16, and 17, and are concentric with the axis of the bore 18. As shown, a well 22a is formed in the center of the face 16 surrounding the bore 18. In addition, a set of three bores 23, 24, and 26 are provided which are parallel to the axis of the threaded bore 18 and are equally spaced radially from the center of the threaded bore and equally spaced angularly around the center of the threaded bore. Another set of bores 27, 28, 29, and 31 may also be provided which are parallel to the axis of the threaded bore 18 and equally spaced angularly around the threaded bore 18. Side faces 32, 32a, 32b, and 32c of the work-holder 12 are ground parallel to the axis of the bore 18 and equally spaced from the bore 18. Adjacent side faces intersect at right angles as shown in Figs. 2 and 4.

When in use, the work-holder 12 can be mounted on a face plate 33 of a machine tool (see Fig. 1). The face plate can be provided with slots 36, only one of which is shown, through which mounting bolts 37 and 38 extend. The bolts 37 and 38 are mounted in counterbored sockets 39 and 41, respectively, adjacent opposite corners of the work-holder 12, as shown in Fig. 1. When the work-holder 12 is mounted on the face plate, the work-holder 12 can be carefully adjusted to be properly and exactly centered thereon. Then a workpiece can be mounted thereon in the manner to be described hereinafter.

In Figs. 6 and 7 is shown a workpiece 43 which is held in a chuck 44. The chuck 44 has a body 46 having an annular boss 47 (Fig. 7) at the lower end thereof. The boss 47 fits snugly inside an adapter ring 48. The adapter ring 48 fits snugly against the flat face 16 and inside the cylindrical face 21 of the work-holder and is complementary to the cylindrical face 21. A threaded opening 49 in the boss 47 receives a stud 51 which extends into the bore 18 to hold the chuck 44 firmly in place with the axis of the chuck centered and aligned with the work-holder. A nut 52 mounted on the stud engages a lower face 53 of the chuck to hold the chuck tightly in place on the stud. As shown in Fig. 7, the well 22a in the work holder receives the nut 51 so that the nut does not interfere with or engage the work holder.

The upper end of the chuck is bifurcated, as indicated in Fig. 7 to form sections 54 and 56 which can flex inwardly under the influence of a screw 57. The screw 57 extends through an opening 58 in the section 56 and is threaded in an opening 59 in the section 54. The upper ends of the sections 54 and 56 terminate in plates 61 and 62 which are substantially half-circular in transverse cross section. The workpiece 43 rests on shoulders 63 and 64 at the upper ends of the bifurcations 54 and 56, respectively, and is engaged by the plates 61 and 62 when screw 57 is tightened. The workpiece 43, which is formed from a length of tubing, may then be machined to shape the exposed end portion 65 thereof while the other end portion 65a thereof is held between the plates 61 and 62. Then the chuck 44 can be removed from the work-holder and the workpiece 43a (Fig. 8) can then be mounted in another chuck 66 and the end portion 65a is machined from the condition indicated in dot-dash lines to that indicated in full lines. The chuck 66 has an annular boss 67 which extends into the adapter ring 48. A threaded bore 69 in the chuck 66 coaxial with the boss 67, receives the stud 51 to attach the chuck 66 to the work-holder 12. The nut 52 holds the chuck 66 in place on the stud with the threads of the stud tightly engaging the threads of the chuck 66. The chuck 66 is provided with a threaded outer bore 71 coaxial with the bore 69 in which a machine screw 72 is received for holding the workpiece 43a in the chuck 66.

The workpiece can quickly and easily be mounted in each chuck and each chuck can quickly and accurately be centered and aligned when mounted in the work-holder. The construction of the work-holder makes it possible rapidly and easily to align and center each of a plurality of workpieces on the same work-holder. As indicated in Fig. 1, index lines 73 are located on the work-holder, and a plurality of work-holders may be employed, each work-holder being mounted on the face plate of one of several tools, which are employed in successive steps in the machining of a workpiece. The chucks 44 and 66 may be provided with appropriate index indicia 73a and 73b, respectively, which can be aligned with index lines of work holders to indicate proper tightening of the chuck in the work-holder. The index indicia 73b can be a bore into which a rod (not shown) can be inserted for use in tightening the chuck 66 with respect to the work-holder 12.

In Figs. 9, 10 and 11, a workpiece 74 is illustrated which is mounted directly on the work-holder 12. The workpiece 74 is provided with an annular flat face 75 which engages the face 14 of the work-holder (Fig. 11). An annular boss 76 on the workpiece 74 has a cylindrical face 77 which engages the cylindrical face 21. A bore 78 in the workpiece coaxial with the cylindrical face 77 receives a stud 79 which extends into the bore 18 of the work-holder to hold the workpiece in properly aligned and centered relation on the work-holder 12. As shown in Figs. 9 and 10, positioning pins 81, 82 and 83 are mounted in the bores 23, 24, and 26, respectively, of the work-holder 12. When so arranged, the work-holder can be used for drilling three bores in the workpiece equally spaced about and parallel to the axis thereof. The pins fit snugly in the bores.

An angle-shaped guide 85 having flat upper and lower faces 86 and 86a (Fig. 9) and having an angle of 60 degrees between its arms 87 and 88 (see Fig. 10) is mounted on the table 89 of a drill press. The position for one of the bores to be drilled in the workpiece is indicated and the work-holder is mounted on the angle-shaped guide 85 with the lower portions of the pins 81, 82, and 83 in engagement with the arms 87 and 88 and with the pin 82 engaging both arms. The angle-shaped guide 85 is then adjusted until the position for the first of the bores is beneath the drill 91 of the drill press. The angle-shaped guide 85 is then clamped in position by clamps 92 and 93. Then the first bore can be drilled. When the first bore has been drilled, the work-holder is swung 120 degrees clockwise and relocated with the pins 81, 82, and 83 again in engagement with the arms 87 and 88 of the angle-shaped guide and the pin 81 engaging both of the arms 87 and 88 to position a location 94 beneath the drill 91 so that a second bore can be drilled at the location 94. When the second bore has been drilled, the work-holder can be rotated another 120 degrees to bring a location 96 beneath the drill so that the third bore can be drilled. In this manner, three holes can rapidly be bored parallel to the axis of the work-holder and workpiece equally spaced from and equally spaced angularly around the axis.

In Fig. 12 the work-holder 12 is shown associated with an angle-shaped guide 97 having an angle of 90 degrees between arms 98 and 99. Pins 101, only three of which are shown, are disposed in the openings in the face 17 of the work-holder. A workpiece 102 is mounted in the work holder in the manner already described. The angle-shaped member is mounted on the table 89 of the drill press and is held in position thereon by clamps 103 and 104. While three of the pins 101 are in engagement with the arms 98 and 99 of the guide 97, each of bores 106, 107, 108, and 109 are drilled in the workpiece 102 by the drill 91. The bores 106, 107, 108 and 109 are equally spaced from the axis of the workpiece and equally spaced angularly around the axis.

The work-holder illustrated is constructed for use in drilling three or four holes equally spaced from and around the axis of a workpiece, but it will be understood that other numbers of pin receiving holes can be formed in a similar work-holder for use with appropriate angle-shaped guides for drilling other numbers of equally spaced bores.

The work-holder described above and illustrated in the drawings is subject to other structural modification without departing from the spirit and scope of the appended claims.

Having described my invention what I claim as new and desire to secure by Letters Patent is:

1. The combination of a member having a flat face, a cylindrical face perpendicular to the flat face and a threaded bore coaxial with the cylindrical face with a work-holder having a flat face releasably engaging the flat face of the member, a cylindrical face complementary to and releasably engaging the cylindrical face of the member, and a threaded bore coaxial with the cylindrical face of the workholder and a stud threaded in the threaded bores to hold the member and the work-holder in assembled relation with the member aligned and centered with relation to the work-holder.

2. The combination of a member having a flat face, a cylindrical face, and a threaded bore coaxial with the cylindrical face with a work-holder having a flat face releasably engaging the flat face of the member, a cylindrical face complementary to and releasably engaging the cylindrical face of the member, and a threaded bore coaxial with the cylindrical face of the work-holder, a stud threaded in the bores of the member and the work-holder to hold the member and the work-holder in assembled relation, the work-holder having a well surrounding the bore thereof and adjacent the member, and a nut threaded on the stud end in engagement with the member to hold the threads of the stud and member in tightly engaging relation.

3. The combination of a member having a flat face, a cylindrical face perpendicular to the flat face and a threaded bore coaxial with the cylindrical face with a work-holder having a flat face releasably engaging the flat face of the member, a cylindrical face complementary to and releasably engaging the cylindrical face of the member, and a threaded bore coaxial with the cylindrical face of the work-holder, a stud threaded in the bores of the member and of the work-holder to hold the member and the work-holder in assembled relation with the member aligned and centered with relation to the work-holder, said body having another flat face parallel to and spaced from the workpiece engaging face, said body having a plurality of positioning bores therein equally spaced from and equally spaced angularly around the threaded bore thereof, pins in the positioning bores, the pins extending through the plane of the last mentioned flat face, and an angle-shaped guide having a flat face engageable with the last mentioned flat face of the body and arms engageable with the pins to position the work-holder and workpiece in pre-selected positions of angular relationship to the angle-shaped guide.

References Cited in the file of this patent

UNITED STATES PATENTS

| | | |
|---|---|---|
| 1,516,764 | Dickinson | Nov. 25, 1924 |
| 2,208,480 | Smith | July 16, 1940 |
| 2,431,594 | Wernig | Nov. 25, 1947 |